(12) United States Patent
Heinzl

(10) Patent No.: US 8,029,675 B2
(45) Date of Patent: Oct. 4, 2011

(54) MEMBRANE DISTILLATION PROCESS AND MEMBRANE DISTILLATION DEVICE

(76) Inventor: Wolfgang Heinzl, Ramerberg (DE)

( * ) Notice: Subject to any disclaimer, the term of this patent is extended or adjusted under 35 U.S.C. 154(b) by 616 days.

(21) Appl. No.: 12/093,196

(22) PCT Filed: Nov. 9, 2006

(86) PCT No.: PCT/EP2006/010757
§ 371 (c)(1),
(2), (4) Date: Sep. 17, 2008

(87) PCT Pub. No.: WO2007/054311
PCT Pub. Date: May 18, 2007

(65) Prior Publication Data
US 2009/0000939 A1    Jan. 1, 2009

(30) Foreign Application Priority Data
Nov. 11, 2005  (DE) .......................... 10 2005 053 874

(51) Int. Cl.
*B01D 61/36* (2006.01)
*B01D 63/08* (2006.01)
*B01D 61/00* (2006.01)
*B01D 63/00* (2006.01)

(52) U.S. Cl. ............... 210/640; 210/321.6; 210/321.74; 210/321.75; 210/321.83; 210/321.84; 203/80; 202/160

(58) Field of Classification Search .................. None
See application file for complete search history.

(56) References Cited

U.S. PATENT DOCUMENTS

| 3,340,186 A | 9/1967 | Weyl |
| 6,716,355 B1 * | 4/2004 | Hanemaaijer et al. ........ 210/640 |

FOREIGN PATENT DOCUMENTS

| EP | 0 088 315 A1 | 2/1983 |
| EP | 0 094 543 A2 | 5/1983 |
| JP | 58-216704 | 12/1983 |
| JP | 63-162002 | 7/1988 |
| JP | 63162002 | 7/1988 |
| WO | WO 00/72947 A1 | 12/2000 |
| WO | WO 2005/089914 A1 | 9/2005 |

OTHER PUBLICATIONS

Schneider K. et al. "Membrandestillation", Chemie Ingenieur Technik, Wiley VCH. Verlag, vol. 56, No. 7, 1994, pp. 514-521.

* cited by examiner

*Primary Examiner* — Krishnan S Menon
(74) *Attorney, Agent, or Firm* — Hershkovitz & Associates, LLC; Abraham Hershkovitz; Eugene C. Rzucidlo

(57) ABSTRACT

In a membrane distillation process in which a liquid to be concentrated is separated from a vapor space (11) by a vapor-permeable liquid- or water-tight membrane or membrane wall (13), to set the absolute pressure of the liquid to be concentrated a reduced pressure is imparted to this which lowers the absolute pressure of the liquid to be concentrated. A corresponding membrane distillation device is also specified.

4 Claims, 5 Drawing Sheets

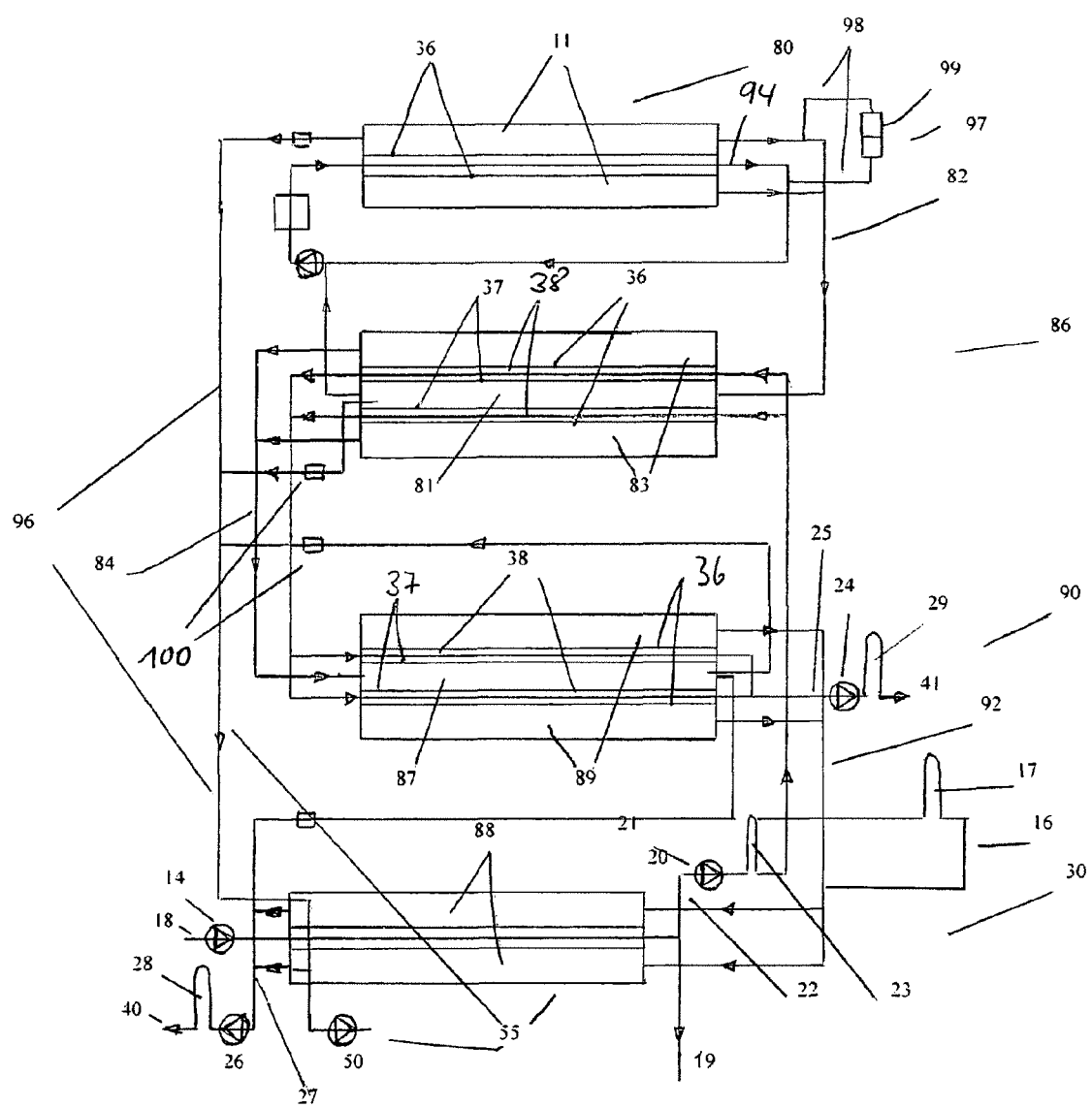

MEMBRANE DISTILLATION PROCESS AND MEMBRANE DISTILLATION DEVICE

FIELD OF THE INVENTION

The invention relates to a membrane distillation process and membrane distillation apparatus in which a liquid to be concentrated is separated from a vapor space by a vapor permeable, liquid-tight or water-tight membrane or membrane wall.

BACKGROUND OF THE INVENTION

During the distillation liquid is vaporized and the vapor is condensed. It is suitable for the separation of liquids having differing vapor pressure and for the full or partial separation of liquids from salt solutions.

A distillation apparatus which can be used, realized and is practicable must be both favorably priced and also energy-efficient. A distillation process is only expedient when both conditions are satisfied.

In classic thermal distillation processes such as the multi-effect relaxation vaporization or multi-stage relaxation vaporization (Multiple Stage Flash MSF) and in thermo-mechanical processes such as the vapor compression process (Vapor Compression VR) the liquid to be concentrated and the vapor are in one space and essentially at the same absolute pressure.

In the membrane distillation process the liquid to be concentrated is bounded at least at one side by a vapor permeable, liquid-tight membrane. This membrane wall is followed by a vapor space which is located at a lower vapor pressure than the liquid to be concentrated. Through the pressure difference vapor arises at the boundary surface of the liquid to be concentrated to the membrane and passes through the membrane.

In the known membrane distillation process the vapor is precipitated at the side of the membrane remote from the liquid in the adjacent colder condensate or the vapor is condensed at a colder surface in the vapor space or it is sucked off and condensed outside.

In the membrane distillation a porous, vapor permeable material is used. In U.S. Pat. No. 3,340,186 an apparatus is described which utilizes an air-filled, micro-porous, hydrophobic membrane. The method described here is based on a direct contact membrane distillation. The warm flow of sea water and the cold flow of distillate are in direct contact with the membrane.

In EP-A-0 088 315 an apparatus is described for the continuous distillation of a hot salt-containing solution or of liquid mixtures with differing vapor pressure.

This apparatus consists of a thermally conductive, vapor impermeable layer which forms an elongate wall, a hydrophobic, vapor permeable membrane which forms an adjacent or oppositely disposed wall and forms an elongate distillate collection chamber or passage together with the vapor impermeable layer. The chamber has an outlet for the distillate. For the preferred embodiment of this membrane distillation a spiral coil configuration is used. Cold sea water or feed flows in a spiral-shaped chamber into the middle and thereby takes up heat from the condensation surface. The feed preheated by the condensation process of the distillate is now further heated by a heating system and then led into the concentrate channel. The hot solution flows outwardly through the channel bounded by the membrane. On flowing through the concentrate channel a part of the solution vaporizes through the membrane.

In EP A 1 185 356 a process for the cleaning of a liquid by membrane distillation is described, in which vapor from a liquid flow arises and passes through a porous wall bounding the liquid flow. The vapor condenses at a cold condenser surface whereby a flow of condensate is formed. The condenser surface separates a supplied liquid flow from the distillate flow. This supplied liquid flow flows in counter-flow to the vapor yielding liquid flow. In order to enlarge the distillate flow a pressure is maintained in the gas channel which, however, lies below the environmental pressure, but above the vapor pressure of the liquid yielding the vapor.

There are now a series of problems which arise in connection with the known membrane distillation processes.

In all known membrane distillation processes in which a vapor space is used this vapor space is separated from the liquid to be vaporized by a vapor permeable, water-tight membrane. This leads in all known membrane distillation processes to a situation in which the vapor space and the space containing the liquid to be concentrated which is bounded by the vapor permeable, liquid-tight membrane are at different absolute pressures.

In membrane distillation processes in which the vapor space is located at a pressure in the region of the environmental pressure the solution is at a pressure level above the environmental pressure, with this pressure level being composed of by the static pressure and the hydraulic pressure loss. This leads to an absolute pressure difference between the space containing the liquid to be vaporized and the space containing the vapor which is separated by the vapor permeable, liquid-tight membrane.

In membrane distillation processes in which the vapor space is at a pressure level below the environmental pressure the absolute pressure difference between the space containing the liquid to be concentrated and the space containing the vapor which is separated by the vapor permeable, liquid-tight membrane is increased by the negative pressure.

This pressure difference between the space containing the liquid to be concentrated and the vapor space, in many applications also associated with a temperature loading of the vapor permeable, liquid-tight membrane by the heated liquid to be concentrated, leads to a high mechanical and thermal loading of the membrane. This substantially reduces the lifetime of the membrane which mainly consists of plastic.

A further problem results in membrane distillation processes in which the heat transfer essentially takes place by condensation and subsequent vaporization. If the heat transport namely takes place through the liquid space, which is bounded on one side by a vapor permeable, liquid-tight membrane and on the other side by a vapor-tight and liquid-tight condensation surface, essentially only by heat conduction in the liquid then, in relation to the condensation and vaporization, only a small quantity of heat can be transferred. The heat quantities comparable to the heat of condensation can only be transferred in the space containing the liquid to be concentrated when boiling can be achieved in this space.

SUMMARY OF THE INVENTION

The invention is based on the object of providing an improved process and also an improved apparatus of the initially named kind in which the above-named problems are overcome.

Having regard to the process this object is satisfied in accordance with the invention in that for the setting of the absolute pressure of the liquid to be concentrated a negative pressure is imparted to it which lowers the absolute pressure of the liquid to be concentrated.

In this connection the pressure of the liquid to be concentrated is preferably lowered to the negative pressure of the distillation process.

The liquids which enter into the negative pressure region of the distillation process and which emerge from this are advantageously separated from the environmental pressure.

In accordance with a preferred practical embodiment of the process of the invention the absolute pressure of the liquid to be concentrated is lowered to or below its boiling vapor pressure corresponding to its temperature.

The negative pressure can expediently be imparted to the liquid to be concentrated via a negative pressure line from a vacuum system.

It is in particular of advantage when the liquids are so supplied to and led away from the membrane distillation process that the pressure difference between the absolute pressure of the membrane distillation process and the environmental pressure is maintained.

The negative pressure connection line is preferably so separated from the liquid to be concentrated that an overflow of the liquid to be concentrated into the vapor space is prevented.

In accordance with a preferred embodiment of the process of the invention the pressure in the vapor space adjacent to the liquid to be concentrated via the membrane or membrane wall is selected to be smaller than the environmental pressure. In this connection the negative pressure in the vapor space preferably corresponds essentially to the vapor pressure of the liquid to be concentrated adjacent via the membrane or membrane wall increased by the differential pressure which results from the flow of the vapor through the membrane or membrane wall.

It is in particular also of advantage when a respective condensation and vaporization takes place in at least two stages.

In this way the circumstance is taken into account that the number of stages influences the energy requirement of the membrane distillation system and that with the increasing number of stages the energy requirement of this membrane distillation system reduces, since a renewed condensation and vaporization takes place with each further stage.

The condensation and vaporization takes place in a respective further stage to a lower pressure level and temperature level than in the respectively preceding stage.

Thus, with the process of the invention, the pressures of the vapor and of the liquids are in particular matched to one another. Moreover, the heat transfer in the liquid to be concentrated is improved. The absolute pressure in the space containing the liquid to be concentrated is brought to a value which is at least substantially the same as or approximately the absolute pressure of the space containing the vapor.

In this connection the process can in particular be designed so that:
a) a negative pressure is imparted to the liquid to be concentrated which lowers the absolute pressure of the liquid to be concentrated,
b) the pressure of the liquid to be concentrated is lowered to a negative pressure, in particular to the negative pressure of the distillation process,
c) the liquids which enter into the negative pressure region of the distillation process and emerge from it, are separated from the environmental pressure, and/or
d) the absolute pressure of the liquid is lowered in particular to or below its boiling vapor pressure corresponding to its temperature.

The absolute pressure of the liquids which enter into the membrane distillation process can in particular be set such that it essentially corresponds to the pressure in the relevant membrane distillation apparatus.

In membrane distillation processes with a vapor space the absolute pressure in the liquid to be concentrated can be set such that it corresponds substantially to the absolute pressure of the vapor space.

The problems named in connection with the known processes can also for example be overcome by the following steps:

A liquid flow to be concentrated which enters into the membrane distillation process is essentially at the same pressure as the absolute pressure of the vapor space of the membrane distillation process. The liquid to be concentrated and the distillate which arise are likewise substantially at the same pressure as the vapor space. The liquids leaving the membrane distillation process are brought back to the environmental pressure again after leaving the membrane distillation process.

It is for example possible for the liquid to be concentrated to be guided at least partly in a spiral-shaped liquid passage which is bounded at one side by a vapor permeable, liquid-tight membrane and at the opposite side by a vapor-tight and liquid-tight condensation surface, with a corresponding spiral-shaped vapor space being formed as a consequence of the spiral-shaped arranged of the liquid passage between its turns and being bounded on the one side by the membrane and on the opposite side by the condensation surface.

This vapor space can be at a negative pressure which is always substantially the same as or below the boiling vapor pressure of the liquid to be concentrated adjacent via the membrane. The absolute pressure of the liquid to be concentrated can essentially be at a pressure which is substantially the boiling vapor pressure corresponding to the temperature of the liquid to be concentrated.

A pressure balance between the vapor space at a negative pressure and the liquid to be concentrated is, for example, achieved via a negative pressure connection line between the supplied liquid and the vapor space. The negative pressure connection line can in particular be so formed with a U-tube integrated into the line that the passage of the supplied liquid to be concentrated into the vapor space is prevented.

U-tubes can be built into the line in which the liquid to be concentrated is supplied, for example by means of a feed pump, and in the line in which the concentrated liquid is led away with a concentrate pump in order to separate the negative pressure in the relevant distillation apparatus from the environmental pressure.

A U-tube which separates the negative pressure of the distillation apparatus relative to the negative pressure of the environment can also be incorporated in the line with which the distillate produced in a distillation apparatus is pumped by the distillation pump outwardly into the environmental pressure.

With regard to the membrane distillation apparatus the object set forth further above is correspondingly satisfied in accordance with the invention in that, for the setting of the absolute pressure of the liquid to be concentrated, a negative pressure is applied to this which lowers the absolute pressure of the liquid.

Preferred embodiments of the membrane distillation apparatus in accordance with the invention are set forth in the subordinate claims.

The membrane distillation apparatus can thus in particular be so designed that
a) a negative pressure is imparted to the liquid to be concentrated which lowers the absolute pressure of the liquid to be concentrated, b) the liquids which enter into the negative pressure region are separated from the environmental pressure by constructional elements,
c) the absolute pressure of the liquid is lowered in particular to or below its boiling vapor pressure, corresponding to its temperature and/or
d) the liquids which enter into the negative pressure space can emerge from it are separated from the environmental pressure by in-built structures.

It is for example possible for the liquid to be concentrated to be at least partly guided in a spiral liquid passage which is bounded on one side by a vapor permeable, liquid-tight membrane and on the opposite side by a vapor-tight and liquid-tight condensation surface, wherein, as a consequence of the spiral arrangement of the liquid passage, a corresponding spiral-shaped vapor space is formed between its turns and is bounded at one side by the membrane and at the opposite side by the condensation surface.

This vapor space can also be located at a negative pressure which is always essentially the same as or below the boiling vapor pressure of the solution adjacent via the membrane. The absolute pressure of the liquid to be concentrated can essentially be at a pressure which is at least substantially the same as the boiling vapor pressure corresponding to the temperature of the liquid.

A pressure balance between the vapor space located at a negative pressure and the liquid to be concentrated can for example be achieved via a negative pressure connection line between the supplied liquid to be concentrated and the vapor space. The negative pressure connection line can in particular be so formed with a U-tube integrated into the line so that the passage of the supplied liquid into the vapor space is prevented.

U-tubes can be built into a line in which the liquid to be concentrated is fed with the liquid pump and in a line in which the concentrated liquid is led away with the concentrate pump in order to separate the negative pressure in a distillation apparatus from the environmental pressure.

A U-tube which separates the negative pressure of the distillation apparatus relative to the negative pressure of the environment can also be incorporated in a line with which the distillate produced in a distillation apparatus is for example pumped outwardly by means of a distillate pump into the environmental pressure.

BRIEF DESCRIPTION OF THE FIGURES

The invention will be explained in more detail in the following with reference to embodiments and to the drawing in which are shown.

DETAILED DESCRIPTION OF THE INVENTION

Figure 1:
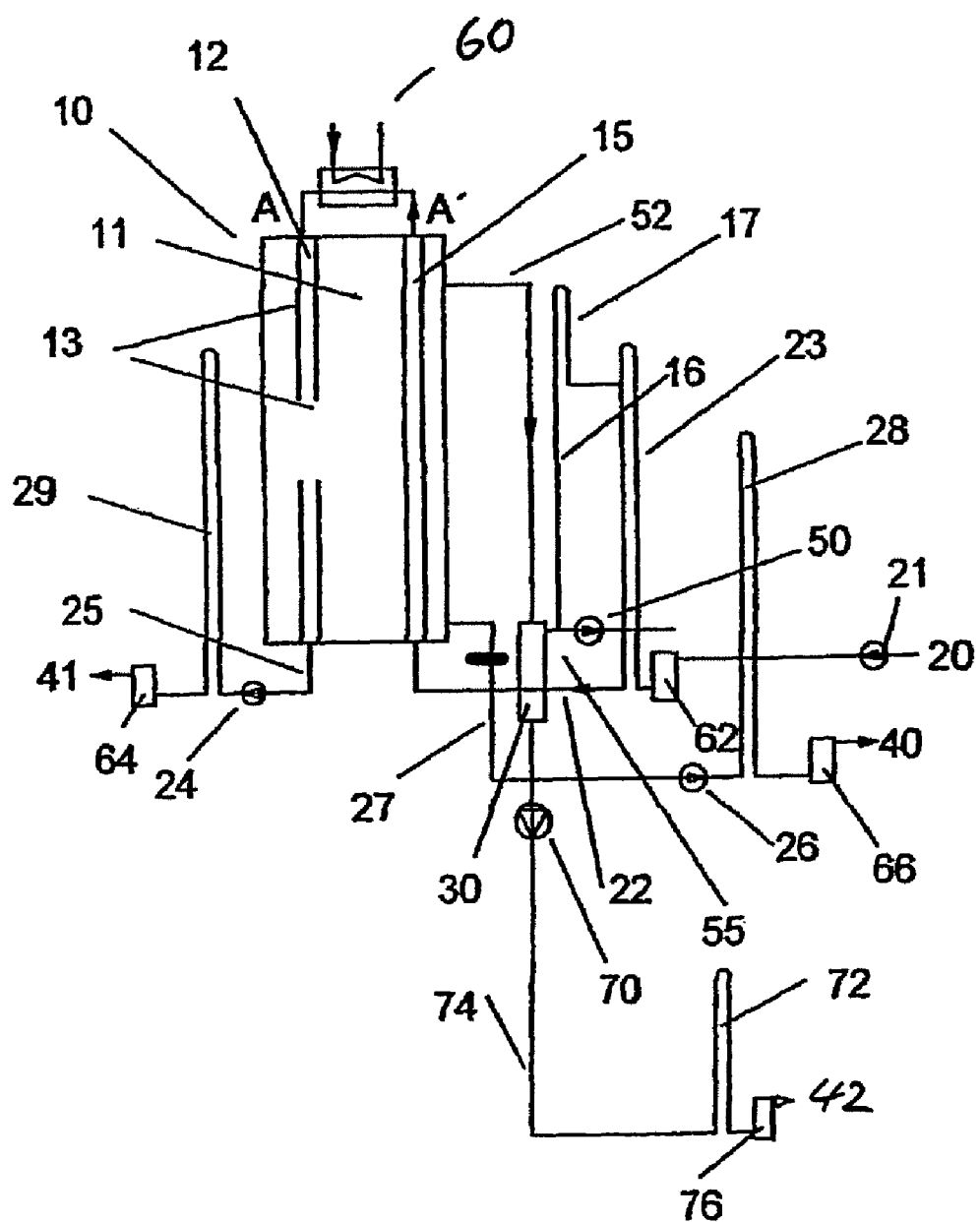
FIG. 1 an exemplary embodiment in which the membrane distillation apparatus contains vapor permeable, liquid-tight hollow filaments and vapor-tight and liquid-tight condensation tubes, FIG. 2 an exemplary embodiment in which the membrane distillation apparatus includes a spiral unit and the pressure separation of the liquids takes place by means of U-tubes, FIG. 3 an exemplary embodiment in which the membrane distillation apparatus includes a double-spiral unit and the pressure separation of the liquids takes place with U-tubes, FIG. 4 an exemplary embodiment in which the membrane distillation apparatus includes a double-spiral unit and the pressure separation of the liquid to be concentrated takes place with U-tubes, and FIG. 5 an exemplary embodiment of a membrane distillation apparatus having two stages each of which serving for condensation and vaporization.
Figure 2:
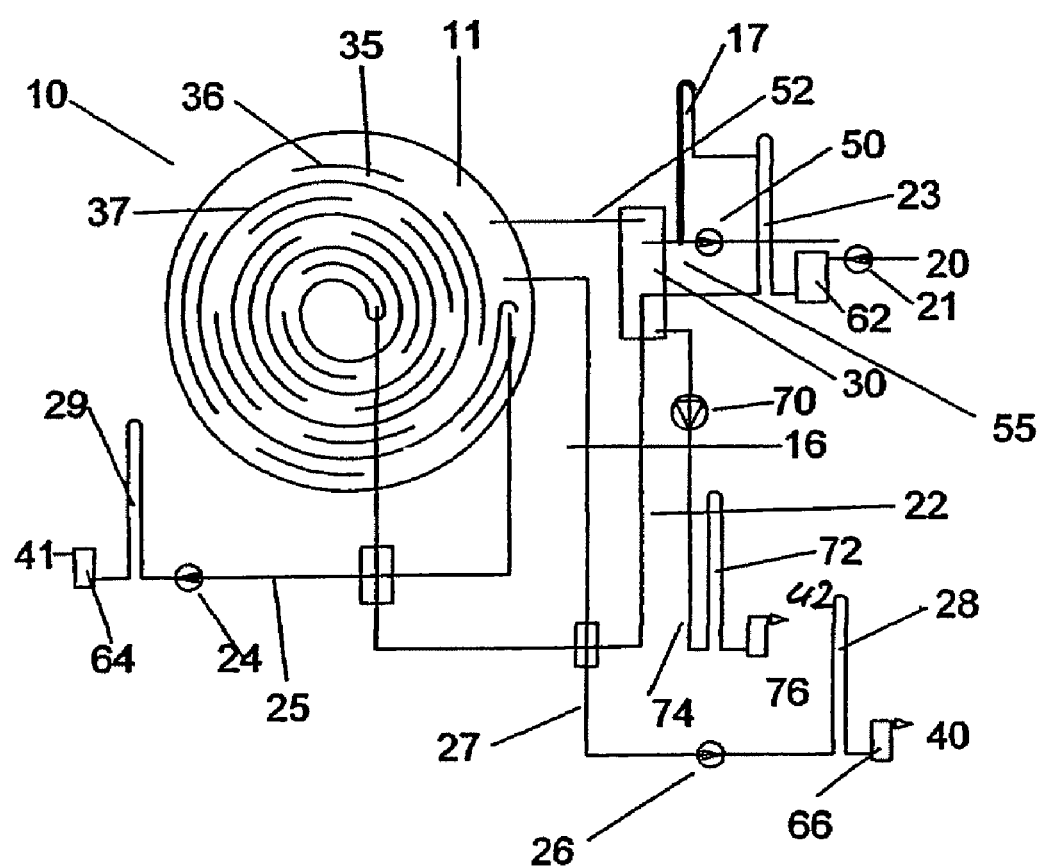
Figure 3:
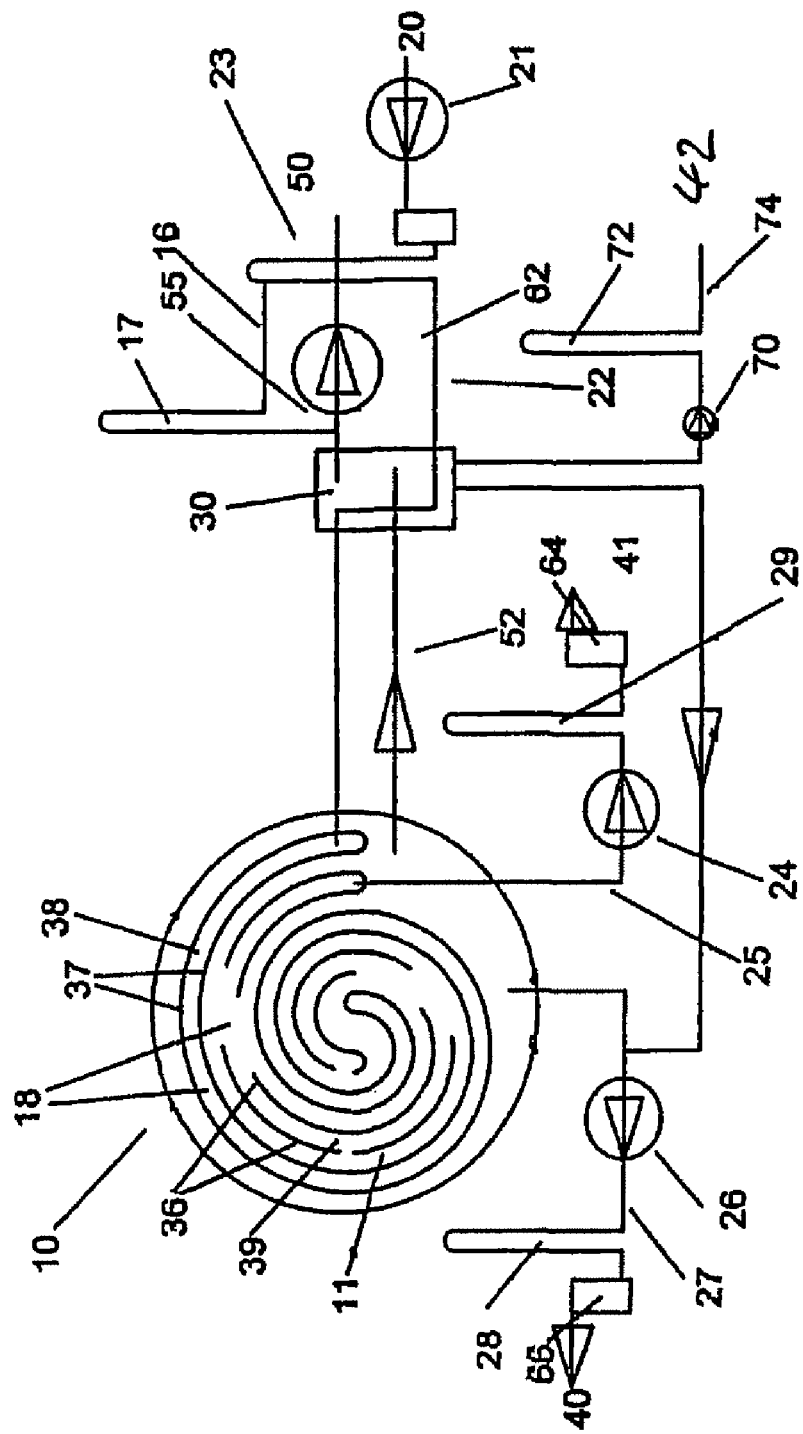

In the embodiments of FIGS. 1, 2 and 3 a negative pressure is imparted to the liquid to be concentrated which lowers the absolute pressure of the liquid to be concentrated. In this connection pressure of the liquid to be concentrated can in particular be reduced to the negative pressure of the distillation process. The liquids which enter into and emerge from the negative pressure region of the distillation process are expediently separated from the environmental pressure. The absolute pressure of the liquid to be concentrated can in particular be reduced to or below its boiling vapor pressure corresponding to its temperature.

In this connection a negative pressure which lowers the absolute pressure of the liquid can be imparted to the liquid to be concentrated via the connection line which contains a U-tube. The liquids which enter into the negative pressure region and which emerge from the negative pressure region can in particular be separated from the environmental pressure by U-tubes built into the lines. The absolute pressure of the liquid to be concentrated is lowered, in particular to or below its boiling vapor pressure corresponding to its temperature.

Figure 4:
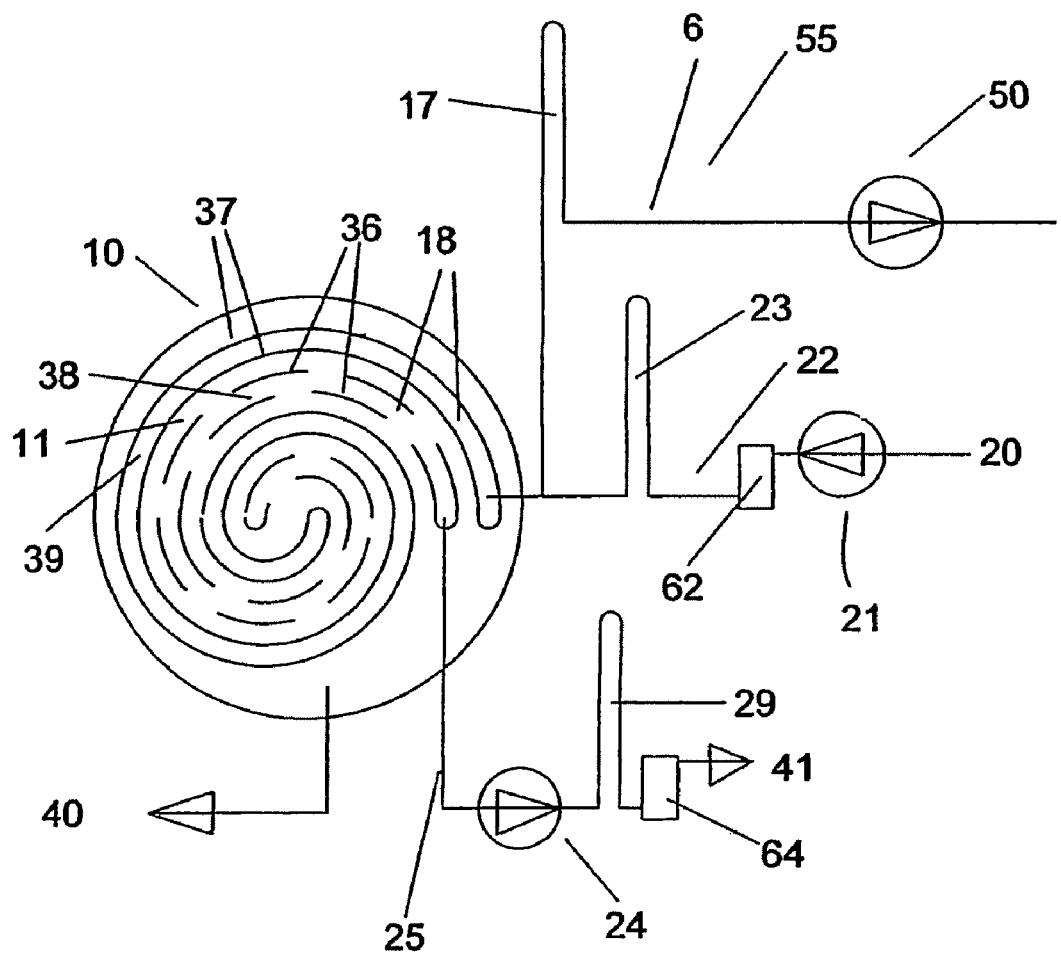

In accordance with the embodiment of FIG. 4 a negative pressure which lowers the absolute pressure of the liquid can be imparted to the liquid to be concentrated via the connection line which contains a U-tube. The liquids which enter into the negative pressure region and which emerge from it can in particular be separated from the environmental pressure by U-tubes built into the lines.

FIG. 1 shows in schematic illustration an exemplary embodiment of a membrane distillation apparatus 10 in accordance with the invention in which a vapor space 11 having a negative pressure and the liquid 20 to be concentrated is bounded by hollow filaments 12, the wall of which is formed by a vapor permeable, liquid-tight membrane 13. The liquid 20 flowing through the membrane distillation apparatus 10 which is to be concentrated and preheated is bounded by a liquid-tight and vapor-tight metal or plastic tube 15 and extends through the same vapor space 11 as the vapor permeable, liquid-tight hollow filaments 12 of the membrane.

The vapor space 11 is at a negative pressure in the region of the boiling vapor pressure of the liquid 20 to be concentrated adjacent via the vapor permeable, liquid-tight membrane 13.

A pressure balance between the vapor space 11 at a negative pressure and the liquid 20 to be concentrated is achieved by a negative pressure connection line 16 between the liquid 20 to be concentrated and the vapor space 11. A part of the negative pressure connection line 16 is formed as a U-tube 17 in order to avoid that the liquid 20 which is supplied and which is to be concentrated flows into the vapor space 11 via the negative pressure connection 16.

The negative pressure is generated by means of a vacuum pump 50 and a condenser 30. The negative pressure is imparted to the vapor space 11 via a negative pressure line 52. The liquid 20 to be concentrated is supplied by means of a feed pump 21 via a liquid line 22 to the membrane distillation apparatus 10. In order to close off the negative pressure in the membrane distillation apparatus 10 relative to the environmental pressure a part of the liquid line 22 is formed as a U-tube 23. The concentrated liquid 41 is pumped by means of a concentrate pump 24 out of the membrane distillation apparatus 10 via a concentrate line 25. In order to close off the membrane distillation apparatus 10 relative to the environmental pressure a part of the concentrate line 25 is designed as a U-tube 29.

The distillate 40 which has arisen in the membrane distillation apparatus 10 is pumped away by means of a distillate pump 26 via a distillate line 27. In order to close off the negative pressure of the membrane distillation apparatus 10 relative to the environmental pressure a part of the distillate line 27 is formed as a U-tube 28.

The distillate which arises in the condenser 30 is pumped away by means of a distillate pump 70 via a distillation line 74 which includes a U-tube 72.

Recipients 62, 64, 66 and 76 with the corresponding liquids 20, 41 and 42 are mounted in the lines 22, 25, 27 and 74 which, as liquid termination with or in the U-tubes 23, 28, 29 and 72, separate the negative pressure in the lines 22, 25, 26 and 74 of the membrane distillation apparatus 10 from the environmental pressure.

The liquid 20 to be concentrated is heated further in a heat exchanger 60 on the path from A to A'.

FIG. 2 shows in schematic illustration a further exemplary embodiment of the membrane distillation apparatus 10 in accordance with the invention.

The membrane distillation apparatus 10 includes here a spiral coil configuration with integrated heat recovery.

The vapor space 11 is at a negative pressure in the region of the boiling vapor pressure of the adjacent liquid 20 to be concentrated which is separated via the vapor permeable, liquid-tight membrane wall 36.

Here a flow passage 35 for the liquid 20 to be concentrated is bounded on one side by a vapor permeable, liquid-tight membrane wall 36 and at the opposite side from it by a vapor-tight and liquid-tight condensation wall 37. Through the spiral coil configuration the vapor permeable, liquid-tight membrane wall 36 lies opposite to the vapor-tight and liquid-tight condensation 37 of the next following outer spiral turn across the vapor space 11.

The negative pressure is produced by means of a vacuum pump 50 and of the condenser 30. The negative pressure is imparted to the vapor space 11 via the negative pressure line 52.

A pressure balance between the vapor space 11 which is at a negative pressure and the liquid 20 to be concentrated is achieved via a negative pressure connection line 16 between the supplied liquid 20 and the vapor space 11.

In order to avoid the supplied liquid 20 to be concentrated flowing into the vapor space 11 via the negative pressure connection line 16 a part of the negative pressure connection line 16 is formed as a U-tube 17.

The liquid 20 to be concentrated is supplied by means of the feed pump 21 via the liquid line 22 to the membrane distillation apparatus 10. In order to separate the negative pressure in the membrane distillation apparatus 10 relative to the environmental pressure a part of the liquid line 22 is designed as a U-tube 23. The concentrated liquid 41 is pumped away by means of the concentrate pump 24 from the membrane distillation apparatus 10 via the concentrate line 25. In order to close off the membrane distillation apparatus 10 relative to the environmental pressure a part of the concentrate line 25 is designed as a U-tube 29.

The distillate 40 which has arisen in the membrane distillation apparatus 10 is pumped away by means of the distillate pump 26 via the distillation line 27. In order to close off the negative pressure of the membrane distillation apparatus 10 relative to the environmental pressure a part of the distillate line 27 is designed as a U-tube 28.

The distillate 42 arising in the condenser 30 is pumped off by means of the distillate pump 70 via the distillate line 74 which contains the U-tube 72.

Recipients 62, 64, 66 and 76 with the corresponding liquids 20, 41 and 42 are mounted in the lines 22, 25, 27 and 74 which, as liquid termination with or in the U-tubes 23, 28, 29 and 72, separate the negative pressure in the lines 22, 25, 26 and 74 of the membrane distillation apparatus 10 from the environmental pressure.

FIG. 3 shows in schematic illustration a further exemplary embodiment of a membrane distillation apparatus 10 in accordance with the invention.

The membrane distillation apparatus 10 includes here a double spiral coil configuration with integrated heat recovery. In this connection two adjacent vapor-tight and liquid-tight condensation walls 37 of metal or plastic form a flow passage 38 for the inflowing liquid 20 to be concentrated whereas two adjacent vapor permeable, liquid-tight membrane walls 36 form a flow passage 39 for the concentrated liquid 41.

Between the adjacent double spirals the vapor space 11 is formed which is filled with vapor and in which the outwardly flowing distillate 40 which arises on the condensation at the condensation walls 37 collects at the bottom.

Through the spiral coil configuration the vapor permeable, liquid-tight membrane wall 36 lies opposite to the vapor-tight and liquid-tight condensation wall 37 of the next following spiral turn across the vapor space.

The vapor space 11 is located at a negative pressure in the region of the boiling vapor pressure of the liquid 20 to be concentrated adjacent via the vapor permeable, liquid-tight membrane 36.

The negative pressure is generated by means of the vacuum pump 50 and of the condenser 30. The negative pressure is imparted via the negative pressure line 52 to the vapor space 11. A pressure balance between the vapor space 11 at a negative pressure and the liquid 20 that is used is achieved via a negative pressure connection line 16 between the supplied liquid 20 to be concentrated and the vapor space 11.

In order to avoid the supplied liquid 20 to be concentrated flowing into the vapor space 11 via the connection line 16 a part of the connection line 16 is formed as a U-tube 17.

The liquid 20 to be concentrated is supplied by means of the feed pump 21 via the liquid line 22 to the membrane distillation apparatus 10. In order to separate the negative pressure in the membrane distillation apparatus 10 from the environmental pressure a part of the liquid line 22 is designed as a U-tube 23. The concentrated liquid 41 is pumped away by means of the concentrate pump 24 out of the membrane distillation apparatus 10 via the concentrate line 25. In order to close off the membrane distillation apparatus 10 relative to the environmental pressure a part of the concentrate line 25 is designed as a U-tube 29.

The distillate 40 arising in the membrane distillation apparatus 10 is pumped away by means of the distillate pump 26 via the distillate line 27. In order to close off the negative pressure of the distillation apparatus 10 relative to the environmental pressure a part of the distillate line 27 is designed as a U-tube 28.

The distillate 40 which arises in the membrane distillation apparatus 10 is pumped away by means of the distillate pump 26 via the distillate line 27. In order to close off the negative pressure of the membrane distillation apparatus 10 relative to the environmental pressure a part of the distillate line 27 is executed as a U-tube 28.

The distillate 42 which arises in the condenser 30 is pumped away by means of the distillate pump 70 via the distillate line 74 which contains the U-tube 72.

Recipients 62, 64, 66 and 76 with the corresponding liquids 20, 41 and 42 are mounted in the lines 22, 25, 27 and 74 which, as a liquid closure with or in the U-tubes 23, 28, 29 and 72, separate the negative pressure in the lines 22, 25, 26 and 74 of the membrane distillation apparatus 10 from the environmental pressure.

FIG. 4 shows in a schematic representation a further exemplary embodiment of the membrane distillation apparatus in accordance with the invention.

This membrane distillation apparatus 10 includes a double-spiral coil configuration with integrated heat recovery. Two adjacent vapor-tight and liquid-tight condensation walls 37 of metal or plastic form the flow passage 38 for the inflowing liquid 20 to be concentrated whereas two adjacent vapor permeable, liquid-tight membrane walls 36 form the flow passage 39 for the concentrated liquid 41. The vapor space 11, which is filled with vapor and in which the distillate 40 flowing outwardly which arises at the condensation walls 37 and collects at the bottom in the vapor space 11, is formed between the adjacent double spirals. If the vapor space 11 is at a pressure in the region of the environmental pressure, the loading of the foils resulting from the hydraulic pressure and the static pressure must be compensated by a negative pressure system.

For this purpose the membrane distillation apparatus 10 is provided with a vacuum system 55 which includes a vacuum pump 50 and a line 60 from the vacuum pump 50 to the liquid line 22 of the liquid 20 to be concentrated. A part of the line 61 leading to the vacuum pump 50 is formed as a U-tube 17 so that no liquid 20 is sucked in with the negative pressure.

The liquid 20 to be concentrated is supplied by means of the feed pump 21 via the liquid line 22 to the membrane distillation apparatus 10. In order to separate the negative pressure in the liquid 20 from the environmental pressure a part of the liquid line 22 is designed as a U-tube 23. The concentrated liquid 41 is pumped by means of a concentrate pump 24 out of the membrane distillation apparatus 10 via a concentrate line 25. In order to close off the negative pressure in the liquid 20 to be concentrated relative to the environmental pressure a part of the concentrate line 25 is formed as a U-tube 29.

Recipients 62 and 64 with the corresponding liquids 20, 41 and 42 are mounted in the lines 22 and 25 which, as a liquid closure with or in the U-tubes 23 and 28, separate the negative pressure in the lines 22 and 25 of the membrane distillation apparatus 10 from the environmental pressure.

The distillate 40 is at environmental pressure and can flow away freely out of the membrane distillation apparatus 10.

FIG. 5 shows in schematic illustration a further exemplary embodiment of the membrane distillation apparatus 10 in accordance with the invention having a vapor generator 80, a first stage 86, a second stage 90 and a condenser 30. All these components are at a pressure level below the environmental pressure.

The absolute pressure in the vapor space 11 of the vapor generator 80 is essentially at the boiling vapor pressure of the liquid adjacent via the membrane wall 36. Through a pressure balance system 97 which includes a connection line 98 between a liquid line 94 and a container 99 closed off relative to the environment, which is partly filled with the liquid and which leads from the container 99 to a connection passage 82, the absolute pressure of the liquid in the vapor generator 80 is brought to the absolute pressure in the vapor space 11.

Vapor from the vapor space 11 of the vapor generator 80 flows via the connection passage 82 into a vapor space 81 of the first stage 86 in which the vapor condenses at the condensation walls 37. The condensate is returned into the liquid circuit of the vapor generator 80.

In a vapor space 83 of the first stage 86 which follows the membrane walls 36, the absolute pressure is smaller than the vapor pressure in the vapor space 81 which adjoins the condensation surface 37. The vapor arising from the liquid 20 passes through the membrane walls 36 into the vapor space 83 which follows the membrane walls 36.

The vapor which arose in the first stage 86 flows via a connection passage 84 into the vapor space 87 of the second stage 90 bounded by the condensation walls 37 and condenses at the condensation walls 37. In a subsequent vapor space 89 the second stage 90 which follows the membrane walls 36 the absolute pressure is lower than the vapor pressure in the vapor space 87 which follows the condensation surfaces 37.

The heat of condensation which is liberated on the condensation of the vapor is transferred by heat conduction via the condensation walls 37 and by vapor generation in the flow passage 38 and subsequent transport with the vapor through the membrane walls 36 into the vapor space 83 or 89 bounded by the membrane walls 36. The vapor which arises in the second stage 90 flows via a connection passage 92 into the vapor space 88 of the condenser 30 bounded by the condensation wall 37 and condenses at the condensation walls 37.

The distillate 40 which arises during the condensation in the second stage 90 and in the condenser 30 is pumped outwardly by means of the distillate pump 26.

The negative pressure in the total apparatus is applied by means of the vacuum system 55 which includes a negative pressure tube system 96, the condenser 30 and the vacuum pump 50.

The non-condensable gases which are liberated from the liquid 20 are pumped away via the negative pressure pipe system 96 out of the membrane distillation apparatus 10. At the same time the negative pressure is built up in the components vapor generator 80, first stage 86, second stage 90 and condenser 30. The negative pressure is set in the components vapor generator 80, first stage 86, second stage 90 and the condenser 30 via restrictors 100.

A pressure balance between the respective vapor spaces 83 and 89 which are at a negative pressure and the liquid 20 to be concentrated is achieved via a connection line 16 between the supplied concentrated liquid 20 and the connection passage 22.

In order to avoid the supplied liquid 20 to be concentrated flowing into the connection passage 92 via the connection line 16, a part of the connection line 16 is formed as a U-tube 17.

Of the liquid 18 supplied to the condenser 30 by means of a pump 14 a part flow is supplied as the liquid 20 to be concentrated to the membrane distillation apparatus 10. The other part flow 19 is rejected.

The liquid 20 to be concentrated is supplied by means of the feed pump 21 via the liquid line 22 to the membrane distillation apparatus 10. In order to separate the negative pressure in the membrane distillation apparatus 10 from the environmental pressure, a part of the liquid line 22 is designed as a U-tube 23. The concentrated liquid 41 is pumped away by means of the concentrate pump 24 out of the membrane distillation apparatus 10 via the concentrate line 25. In order to close off the membrane distillation apparatus 10 from the environmental pressure, a part of the concentrate line 25 is designed as a U-tube 29.

In order to close off the negative pressure of the membrane distillation apparatus 10 from the environmental pressure, a part of the distillation line 27 is moreover executed as a U-tube 28.

REFERENCE NUMERAL LIST 10 membrane distillation apparatus
11 vapor space
12 hollow filaments of the membrane
13 membrane
14 pump
15 metal or plastic tube, condensation tube
16 negative pressure connection line
17 U-tube
18 liquid
19 part flow
20 liquid to be concentrated
21 feed pump
22 liquid line
23 U-tube
24 concentrate pump
25 concentrate line
26 distillate pump
27 distillate line
28 U-tube
29 U-tube
30 condenser
35 flow passage
36 membrane wall
37 condensation wall
38 flow passage
39 concentrate flow passage
40 distillate
41 liquid to be concentrated, concentrate
42 distillate
50 vacuum pump
52 negative pressure line
55 vacuum system
60 heat exchanger
61 line
62 recipient for the feed U-tube
64 recipient for the concentrate U-tube
66 recipient for the distillate tube
70 distillate pump
72 U-tube
74 distillate line
76 recipient for the distillate U-tube
80 vapor generator
81 vapor space
82 connection passage
83 vapor space
84 connection passage
86 first stage
87 vapor space
88 vapor space
89 vapor space
90 second stage
92 connection passage
94 liquid line
96 negative pressure tube system
97 pressure balance system
98 connection line
99 container
100 restrictors

The invention claimed is:

1. A multistage membrane distillation process in which vapor from a vapor space (11) of a vapor generator (80) having an independent liquid circuit is supplied to a first vapor space (81) of a first stage (86), the vapor condensing at condensation walls (37) bounding the first vapor space (81), at the side opposite the first vapor space (81), the condensation walls being respectively adjacent to a flow passage (38) guiding a liquid (20) to be concentrated which is bounded at the side opposite to the relevant condensation wall (37) by a vapor permeable, liquid-tight or water-tight membrane wall (36) through which the liquid (20) to be concentrated is separated from a second vapor space (83) of this first stage (86), with the vapor arising from the liquid (20) to be concentrated passing through the membrane wall (36) into the second vapor space (83) and a negative pressure is imparted to the liquid (20) to be concentrated to set the absolute pressure of the liquid (20) to be concentrated, with the negative pressure lowering the absolute pressure of the liquid (20) to be concentrated, wherein the vapor from the second vapor space (83) of the first stage (86) is transferred into a first vapor space (87) of a second stage (90) which is bounded by condensation walls (37) on which the vapor condenses and which are respectively adjacent at the side opposite to the first vapor space (87) to a flow passage (38) guiding the liquid (20) to be concentrated, which is again bounded at the side lying opposite to the relevant condensation wall (37) by a membrane wall (36) by which the liquid (20) to be concentrated is separated from a second vapor space (89) of this second stage (90), the absolute pressure of the liquid (20) to be concentrated present in the two stages (86, 90) is lowered to its boiling vapor pressure corresponding to its temperature, in the two stages (86, 90), the respective pressure in the second vapor space (83, 89) adjacent to the liquid (20) to be concentrated via the membrane wall (36) is selected to be lower than the environmental pressure, in each of the two stages (86, 90) the negative pressure in this second vapor space (83, 89) corresponds at least substantially to the vapor pressure of the liquid (20) to be concentrated adjacent via the membrane wall (36), increased by the differential pressure resulting on the flow of the vapor through the membrane wall (36), a respective condensation and vaporization takes place in at least the two stages (86, 90), wherein the condensation and vaporization takes place in a respective further stage at a lower pressure level and temperature level than in the respectively preceding stage, the vapor from the second vapor space (83) of the last stage (90) is transferred via a communication passage (92) into a vapor space (88) of a condenser (30), by means of a vacuum system (55), a negative pressure is applied in the vapor space (11) of the vapor generator (80), in the respective first vapor space (81, 87) of the stages (86, 90) and in the vapor space (88) of the condenser (30), and the corresponding pressure equalization between the respective second vapor space (83, 89) at a negative pressure and the liquid (20) to be concentrated is generated via a communication line (16) between the supplied liquid (20) to be concentrated and the communication passage (92).

2. A multistage membrane distillation apparatus in which vapor from a vapor space (11) of a vapor generator (80) having an independent liquid circuit is supplied to a first vapor space (81) of a first stage (86) which condenses at condensation walls (37) bounding the first vapor space (81) which are respectively adjacent at the side opposite to the first vapor space (81) to a flow passage (38) guiding the liquid (20) to be concentrated which is bounded at the side opposite to the relevant condensation wall (37) by a vapor permeable, liquid-tight or water-tight membrane (36) through which the liquid

(20) to be concentrated is separated from a second vapor space (83) of this first stage (86), with the vapor arising from the liquid (20) to be concentrated passing through the membrane wall (36) into the second vapor space (83) and with a negative pressure being imparted to the liquid (20) to be concentrated for the setting of the absolute pressure of the liquid (20) to be concentrated, with the negative pressure lowering the absolute pressure of the liquid (20), in particular for carrying out the process in accordance with claim 1, wherein the vapor from the second vapor space (83) of the first stage (86) is transferred into a first vapor space (87) of a second stage (90) which is bounded by condensation walls (37) on which the vapor condenses and which are respectively adjacent at the side opposite to the first vapor space (87) to a flow passage (38) guiding the liquid (20) to be concentrated, the flow passage (38) being bounded again at the side opposite to the relevant condensation wall (37) by a membrane wall (36) by which the liquid (20) to be concentrated is separated from a second vapor space (89) of this second stage (90), the absolute pressure of the liquid (20) to be concentrated which is present in the two stages (86, 90) is lowered to its boiling vapor pressure corresponding to its temperature, in each of the two stages (86, 90) the pressure in the second vapor space (83, 89) adjacent to the liquid (20) to be concentrated via the membrane wall (36) is selected to be lower than the environmental pressure, in the two stages (86, 90) in each case the negative pressure in this second vapor space (83, 89) corresponds at least substantially to the vapor pressure of the liquid (20) to be concentrated adjacent via the membrane wall (36), increased by the differential pressure resulting on the flow of the vapor through the membrane wall (36), at least the two stages (86, 90) are provided for a respective condensation and vaporization, wherein the condensation and vaporization takes place in a respective further stage at a lower pressure level and temperature level than in the respective preceding stage, the vapor from the second vapor space (83) of the last stage (86) is conveyed via a communication passage (92) into a vapor space (88) of a condenser (30), a vacuum system (55) is provided for the application of a negative pressure in the vacuum space (11) of the vacuum generator (80), in the respective first vapor space (81, 87) of the stages (86, 80) and in the vapor space (88) of the condenser (30), and a communication line (16) is provided between the supplied liquid (20) to be concentrated and the communication passage (92) to achieve the corresponding pressure equalization between the respective second vapor space (83, 89) at a negative pressure and the liquid (20) to be concentrated.

3. The apparatus in accordance with claim 2, wherein the lines (22, 25, 27) entering into the negative pressure region and emerging from it are so provided with recipients that the liquids (20, 40, 41) contained in these recipients separate the negative pressure in the membrane distillation apparatus from the environmental pressure via U-tubes (23, 28, 29).

4. The apparatus in accordance with claim 2, wherein the liquids (20, 40, 41) which enter into the negative pressure region and emerge from it are separated from the environmental pressure via mechanical closures.

\* \* \* \* \*